UNITED STATES PATENT OFFICE.

RENÉ BOHN, OF MANNHEIM, AND PAUL NAWIASKY, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CHROMIUM COMPOUNDS OF AZO DYES.

1,264,604.  Specification of Letters Patent.  Patented Apr. 30, 1918.

No Drawing.  Application filed July 10, 1913.  Serial No. 778,243.

*To all whom it may concern:*

Be it known that we, RENÉ BOHN, Ph.D., and PAUL NAWIASKY, Ph.D., citizens, respectively, of the Swiss Republic and the Austrian Empire, residing, respectively, at Mannheim and Ludwigshafen-on-the-Rhine, Germany, have invented new and useful Improvements in Chromium Compounds of Azo Dyes, of which the following is a specification.

We have found that chromable azo coloring matters containing at least one hyroxyl and one sulfonic acid group can be made to yield chromium compounds which are soluble, by being heated with a chromium salt in the presence of water. For the purposes of our invention, it is equivalent whether the free sulfonic acid or hydroxyl groups or a salt of such groups be present. We mention as particularly useful for the purposes of our invention the azo coloring matters which are derived from ortho-amino-phenols or ortho-amino-napthols or anthranilic acid or benzidin disulfonic acid or tolidin disulfonic acid or from a derivative of any one of these compounds, whereby in particular salicylic acid and derivatives thereof may be employed as the other component. Our new compounds are soluble in water and have an intense color and can be applied for printing purposes, the compounds thus obtained being better and more completely fixed and consequently faster than the prints obtained by applying the chromable azo coloring matter in the presence of a chromium salt to the fiber. The new compounds, after being printed on the fiber, can be fixed by means of alkaline reagents, such for instance as sodium carbonate, or ammonia, and thus differ from the mere mixtures of chromable azo compounds and chromium salts which cannot suitably be fixed by such a process.

The following examples will serve to illustrate further the nature of our invention and how it can be carried into practical effect, but the invention is not confined to these examples. The parts are by weight.

Example 1.

Introduce 10 parts of the azo coloring matter obtainable from tolidine-meta-disulfonic acid+2 mols. salicylic acid and probably possessing a constitution corresponding to the formula:—

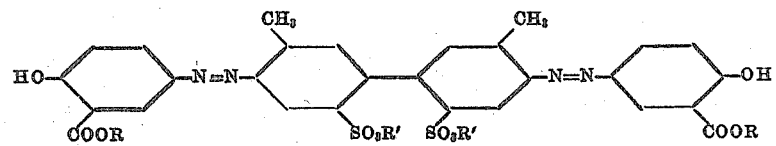

R and R' indicating hydrogen or an alkali metal) into a solution containing three parts of chromium fluorid and 5 parts of chromium formate in six hundred parts of water. Heat the mixture to the boiling point, whereupon a reddish brown solution is obtained. When the shade of the solution no longer changes, the formation of the new compound is complete. The solution can, if desired, be concentrated and it is preferred in this case to add 2.5 parts of glass powder and then to evaporate the solution to, say, 100 parts and then to separate the solution from any precipitate. The new compound, on being printed on the fiber and fixed as aforesaid, gives rise to yellow shades.

A similar compound can be obtained from the corresponding azo coloring matter obtained from benzidin - meta - disulfonic acid and 2 molecular proportions of salicylic acid.

Example 2.

Dissolve 50 parts of chromium fluorid in 1,000 parts of water, add 50 parts of the coloring matter obtainable from diazotized 1.4 - naphthylamin - sulfonic acid and salicylic acid and 10 parts of glass powder and boil the mass until the color of the mixture no longer changes. Then evaporate until the weight of the residue is 500 parts. A deep yellowish brown solution is obtained and, by the addition of common salt, the new chromium compound can be precipitated as a brown powder which is easily soluble in water, the solution being brownish yellow. On the addition of caustic soda to this solution, the color changes only slightly to red-brown, whereas the original azo coloring matter forms a yellow solution in water, which, upon the addition of caustic soda, becomes orange-red.

*Example 3.*

Boil together, for several hours, 50 parts of the azo coloring matter obtainable from 4-nitro-2-diazo-phenol and 2-naphthol-6-sulfonic acid, 67.4 parts of normal chromium acetate and 1,100 parts of water. Then evaporate until the residue amounts to 500 parts. A deep brownish Bordeaux-red solution is obtained, from which, upon standing, part of the compound separates out. On adding common salt to the solution the new chromium compound is obtained as a blue precipitate. It yields a brownish Bordeaux-red solution in water and, on the addition of caustic soda, becomes grayish blue, in contradistinction to the original coloring matter which, upon the addition of caustic soda to its solution, becomes reddish brown.

In the foregoing examples, instead of chromium fluorid and chromium acetate, other chromium salts, such for instance as chromium chlorid and chromium formate can be employed. When salts of mineral acids are employed, it is preferred to add compounds which bind mineral acid and when chromium fluorid is employed, silicious compounds should be added. Other azo coloring matters of the aforesaid kind can be used according to this invention, for instance the azo coloring matter obtainable from diazotized anthranilic acid and 2-naphthol-3.6-disulfonic acid, the chromium compound of the solution of which in water is brownish red and also the azo coloring matter obtainable from 4-nitro-2-diazophenol and 1.8-amino-naphthol-3.6-disulfonic acid which yields a compound the solution of which in water is blue.

*Example 4.*

Prepare a printing paste from 300 parts of the chromium compound obtainable according to the foregoing Example 2, 500 parts of thickening (prepared from 44 parts of acetic acid, 66 parts of starch, 22 parts of glycerin and 6.6 parts of gum tragacanth and sufficient water to make up 500 parts), 40 parts of formic acid and 160 parts of water. Print this on the material, dry and steam for 5 minutes in the Mather-Platt apparatus, wash with water and finish in the usual way. A reddish yellow print is obtained which is fast against the action of soap, chlorin and light.

Instead of steaming the print, it can be fixed by treating it, for about 2 minutes at 50° C., with a solution containing 10 ccm. of 20% ammonia in each liter, or, if desired, the print can be fixed by means of ammonia fumes.

In a similar manner, the other chromium compounds obtained as hereinbefore described, can be used for printing. Thus the chromium fluorid compound obtained from the coloring matter diazo-anthranilic acid +2-naphthol-3.6-disulfonic acid yields red effects, while that obtainable from diazotized 4-nitro-2-aminophenol and 1.8-amino-naphthol-3.6-disulfonic acid yields green effects. In these cases, however, it is preferable to steam for about 1 hour at a pressure of one atmosphere and a half.

Now what we claim is:—

1. The process of producing soluble chromium compounds of azo coloring matters containing at least one hydroxyl and one sulfonic acid group by heating such azo coloring matter with a chromium salt in the presence of water.

2. The process of producing a soluble chromium compound of an azo coloring matter by heating the azo dye prepared from tolidin-meta-disulfonic acid and salicylic acid with chromium fluorid in the presence of water.

3. As new articles of manufacture the compounds which can be obtained by heating an azo coloring matter containing at least one hydroxyl and one sulfonic acid group with a chromium salt in the presence of water, which new compounds contain an azo coloring matter residue and chromium, are soluble in water and intensely colored and, on being steamed in the presence of fiber, yield insoluble lakes giving shades of excellent fastness.

4. As a new article of manufacture the compound which can be obtained by heating the azo coloring matter possessing the formula

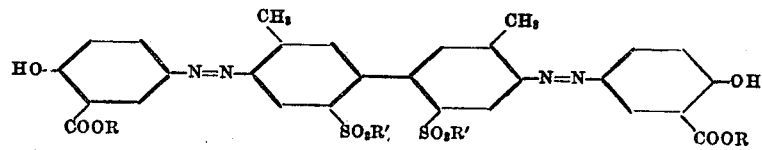

(R and R' indicating hydrogen or an alkali metal) with chromium fluorid in the presence of water, which new compound contains the residue of the dye tolidin-meta-disulfonic acid+two mols. salicylic acid and chromium, is soluble in water with a yellow color and, on being steamed in the presence of fiber, yields insoluble lakes giving yellow shades of excellent fastness.

In testimony whereof we have hereunto set our hands in the presence of two subscribing witnesses.

RENÉ BOHN.
PAUL NAWIASKY.

Witnesses:
JOSEPH PFEIFFER,
T. ALEC. LLOYD.